(No Model.)
N. RUBINSTEIN, C. CLULEY & E. CLARKE.
PEDAL AND CRANK FOR VELOCIPEDES.
No. 523,596. Patented July 24, 1894.
Fig: 1.
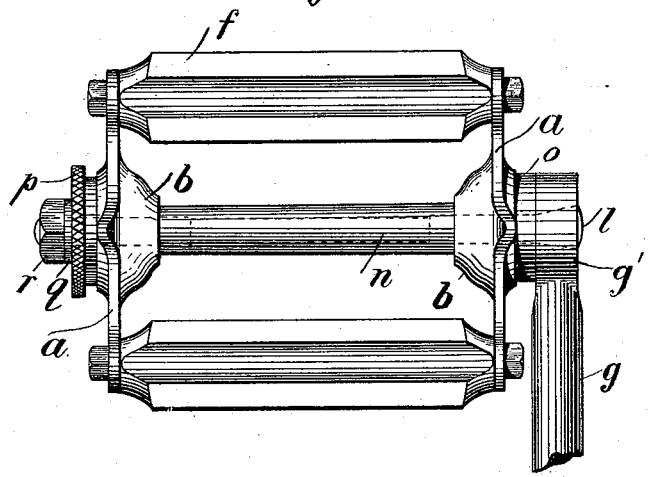
Fig: 2.
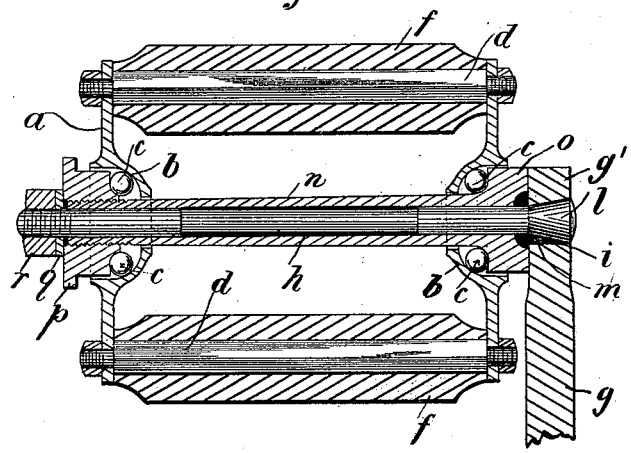
Witnesses
W Wagner
E H Harberd
Inventors
Nicolas Rubinstein
Charles Cluley
Ernest Clarke
per J. E. Halford
Attorney

UNITED STATES PATENT OFFICE.

NICOLAS RUBINSTEIN, CHARLES CLULEY, AND ERNEST CLARKE, OF COVENTRY, ENGLAND.

PEDAL AND CRANK FOR VELOCIPEDES.

SPECIFICATION forming part of Letters Patent No. 523,596, dated July 24, 1894.

Application filed November 28, 1893. Serial No. 492,297. (No model.)

*To all whom it may concern:*

Be it known that we, NICOLAS RUBINSTEIN, a subject of the Emperor of Russia, CHARLES CLULEY and ERNEST CLARKE, subjects of the Queen of Great Britain, and all residents of Coventry, in the county of Warwick, England, have invented certain new and useful Improvements in Pedals and Cranks for Velocipedes and the Like, of which the following is a specification.

The object of this invention is to enable the pins of velocipede and the like cranks to be secured in the crank web in such a manner that the inner end of the said pin shall be flush or nearly so with the crank-web thereby saving the space occupied by the nut usually employed for this purpose and so enabling the width over all of the pedals and cranks to be diminished without decreasing the width of the crank shaft bracket or bearings.

In the accompanying drawings:—Figure 1 shows elevation of a ball bearing bicycle pedal attached to a crank constructed according to this invention. Fig. 2 is a section of the same.

The same letters denote the same parts in both figures.

$a\ a$ are the side plates of the ordinary pedal fitted with ball races $b\ b$.

$c\ c$ are the hard steel balls $d\ d$ the pedal bolts holding the plates $a\ a$ together $f\ f$ the rubber treads.

$g$ is the crank $g'$ the eye into which the bolt $h$ is inserted. The eye $g'$ has a tapered hole formed therein by slotting or boring which hole is also provided with a recess or keyway $i$.

$n$ is the crank pin having a flange $o$ forming a ball race at the end next to the crank the said flange being preferably slightly recessed to insure a firm bearing of the outer portion of the said flange on the crank. The outer end of the tube $n$ has a screw thread cut thereon which engages with a similar thread on the adjustable ball race $p$ which serves to set up the ball bearing in the usual way.

$h$ is a bolt having a screw thread at the outer end thereof and a tapered head $l$ accurately fitting the hole in the eye $g'$ at the inner end the head $l$ being provided with a pin or key $m$ to prevent it from rotating in the crank eye.

When the pedal has been placed on the tube $n$ and the bearing adjusted a washer $q$ having a D shaped hole therein is placed on the central bolt $h$ on which is cut a flat to receive the washer and the nut $r$ screwed up tight drawing the head of the pin $h$ into the hole in the eye $g'$ and forcing the flange $o$ to bear firmly against the crank. Care must be taken that when the bearing is properly adjusted the tube $n$ does not project beyond the cone $p$ but that the washer $q$ bears evenly against the head of the ball race $p$. The washer $q$ and nut $r$ also prevent the ball race $p$ from rotating or "slacking back."

To apply our invention to existing cranks having square holes in the eyes thereof we may either form the pins $n$ with tapering square heads and file out the holes in the crank eyes to fit the same or we may form the said pin with a pan or other suitably shaped head and a square tapered neck fitting the hole in the crank eye.

What we do claim as our invention, and desire to secure by Letters Patent, is—

In cranks and pedals for velocipedes and the like the combination of a central bolt having a tapered head thereon fitting a tapered hole in the crank eye with a tubular crank pin $n$ having a flange shaped to form a ball race at one end thereof and a screw thread to receive an adjustable ball race $p$ at the other end of the said pin and a ball bearing pedal the whole adapted to be secured to the crank by means of a nut $r$. and washer $q$ substantially as specified.

NICOLAS RUBINSTEIN.
CHARLES CLULEY.
ERNEST CLARKE.

Witnesses:
    WILLIAM BARTON,
*Clerk to Mess. Dewes, Seymour & Wilks,*
    *Solrs., 10 Hay Lane, Coventry.*
    MONTAGUE WILKS,
*Public Notary, Coventry, England.*